United States Patent
Kumar et al.

(10) Patent No.: US 9,786,039 B2
(45) Date of Patent: Oct. 10, 2017

(54) METHOD AND SYSTEM FOR PROCESSING AN IMAGE EXTRACTED FROM A DOCUMENT

(71) Applicant: Wipro Limited, Bangalore (IN)

(72) Inventors: Sendil Kumar Jaya Kumar, Bangalore (IN); Sujatha Jagannath, Kolkata (IN)

(73) Assignee: WIPRO LIMITED, Bangalore (IN)

( * ) Notice: Subject to any disclaimer, the term of this patent is extended or adjusted under 35 U.S.C. 154(b) by 54 days.

(21) Appl. No.: 15/066,206

(22) Filed: Mar. 10, 2016

(65) Prior Publication Data
US 2017/0213326 A1   Jul. 27, 2017

(30) Foreign Application Priority Data
Jan. 26, 2016   (IN) .............................. 201641002817

(51) Int. Cl.
| | | |
|---|---|---|
| G06K 9/00 | (2006.01) | |
| G06T 5/00 | (2006.01) | |
| G06T 5/20 | (2006.01) | |
| G06T 7/40 | (2017.01) | |
| G06T 7/00 | (2017.01) | |

(52) U.S. Cl.
CPC ............... *G06T 5/005* (2013.01); *G06T 5/20* (2013.01); *G06T 7/0081* (2013.01); *G06T 7/408* (2013.01); *G06T 2207/20192* (2013.01); *G06T 2207/30176* (2013.01)

(58) Field of Classification Search
CPC .............. H04N 21/466; H04N 21/4318; G06T 7/0002; G06T 2207/10024
USPC ....... 382/156, 157, 164, 165, 170, 266, 269, 382/275, 282; 358/537, 538, 452, 453
See application file for complete search history.

(56) References Cited

U.S. PATENT DOCUMENTS

| | | | | |
|---|---|---|---|---|
| 6,996,295 B2 * | 2/2006 | Tyan | ................. | G06F 17/30253 382/113 |
| 7,234,645 B2 * | 6/2007 | Silverbrook | ............... | B41J 2/14 235/454 |
| 7,280,696 B2 * | 10/2007 | Zakrzewski | ....... | G06K 9/00771 382/218 |
| 7,505,604 B2 * | 3/2009 | Zakrzewski | ....... | B64D 45/0015 382/100 |

(Continued)

OTHER PUBLICATIONS

European Search Report from the European Patent Office in counterpart European Application No. 16160239.6 dated Mar. 20, 2017. 8 pages.

*Primary Examiner* — Yosef Kassa
(74) *Attorney, Agent, or Firm* — Finnegan, Henderson, Farabow, Garrett & Dunner LLP (57) ABSTRACT

The present disclosure relates to a method and system for processing an image extracted from a document. The image processing system detects one or more edges of the image and determines a missing edge in the image by comparing color gradients of the edges. The missing edges are recreated by cloning image pixels based on data pixels of an edge, opposite to the missing edge, amongst the one or more edges to obtain a reconstructed image. Outer corner points in the reconstructed image are identified based on quadratic corner points, wherein the quadratic corner points are determined based on the one or more edges and the reconstructed edge. Further, the image processing system performs an image perspective correction on the reconstructed image, based on the outer corner points, to obtain a processed image.

13 Claims, 7 Drawing Sheets

(56) References Cited

U.S. PATENT DOCUMENTS

| | | | |
|---|---|---|---|
| 7,805,011 B2* | 9/2010 | Klamer | G11B 27/031 |
| | | | 382/190 |
| 8,400,502 B2* | 3/2013 | Zakrzewski | B64D 45/0015 |
| | | | 348/122 |
| 8,755,837 B2 | 6/2014 | Rhoads et al. | |
| 8,774,465 B2 | 7/2014 | Christopulos et al. | |
| 8,861,864 B2 | 10/2014 | Hong et al. | |
| 8,929,877 B2 | 1/2015 | Rhoads et al. | |
| 2009/0238485 A1* | 9/2009 | Heaney, Jr. | G06K 9/00449 |
| | | | 382/256 |
| 2012/0183182 A1 | 7/2012 | Kumar et al. | |
| 2014/0368891 A1* | 12/2014 | Beato | G06K 9/00463 |
| | | | 358/474 |

* cited by examiner

METHOD AND SYSTEM FOR PROCESSING AN IMAGE EXTRACTED FROM A DOCUMENT

TECHNICAL FIELD

The present subject matter is related, in general to image processing, and more particularly, but not exclusively to a method and system for processing an image extracted from a document.

BACKGROUND

Image processing is a method of converting an image into digital form and performing some operations on it, in order to get an enhanced image or to extract some useful information from the image. Image processing is a type of signal dispensation in which, input is an image or a photograph and output may be an enhanced image or characteristics associated with the input image. Usually image processing system treats images as two dimensional objects while applying already set image processing methods onto them.

Generally, servers and/or computing systems present in service domains such as banks, mobile service providers, and government agencies/authorities find it very difficult to detect and retrieve required information from a faulty image, such as a photograph of a government issued identification card, received from a user. In such cases, a manual verification of the faulty images is performed to retrieve the required information and to input the information to the concerned servers and/or computing systems. However, the manual verification of the images is time consuming and the retrieved information is prone to human errors. Hence, there is a need for correcting and processing the faulty images before sending the images for automatic retrieval of information.

The conventional techniques for correcting and processing a faulty image perform visual inspection of the faulty images for comparing the current images taken in real-time with a set of old images to assess change in the object. However, the conditions under which the current images are acquired affect the ability to obtain an accurate comparison. Specifically, such methods of assessing an image do not take into consideration, the factors such as image alignment, missing areas/edges/corners in the image, and color and texture of the image and its background which may lead to inaccuracies.

The issues typically faced in processing an image are detecting boundary of the image when background of the image and the captured image have similar color and texture, and identifying a missing edge and/or corners in the captured image.

SUMMARY

Disclosed herein is a method and system for processing an image extracted from a document. In order to process the image extracted from the document, it is required that the image processing system is able to identify and correct noisy, corrupt and unclear parts on the image. The image processing method used herein performs various techniques, such as, image preprocessing, missing edge detection and perspective image correction for processing the image extracted from the document.

Accordingly, the present disclosure relates to a method for processing an image extracted from a document. The method comprises detecting, by an image processing system, one or more edges of the extracted image. The image processing system determines a missing edge in the image by comparing color gradients of the one or more edges of the image. The missing edge is reconstructed by cloning image pixels based on data pixels of an edge, opposite to the missing edge, amongst the one or more edges to obtain a reconstructed image. Further, the image processing system identifies outer corner points in the reconstructed image based on quadratic corner points, wherein the quadratic corner points are determined based on the one or more edges and the reconstructed edge. An image perspective correction is performed on the reconstructed image, based on the outer corner points, to obtain a processed image.

Further, the present disclosure relates to an image processing system for processing an image extracted from a document. The image processing system detects one or more edges of the image. A missing edge is determined in the image by comparing colour gradients of the one or more edges. The determined missing edge is reconstructed by cloning image pixels based on data pixels of an edge, opposite to the missing edge, amongst the one or more edges to obtain a reconstructed image, wherein the reconstructed image includes a reconstructed edge. The image processing system further comprises identifying outer corner points in the reconstructed image based on quadratic corner points, wherein the quadratic corner points are determined based on the one or more edges and the reconstructed edge. An image perspective correction is performed on the reconstructed image, based on the outer corner points, to obtain a processed image.

Furthermore, the present disclosure relates to a non-transitory computer readable medium including instructions stored thereon that when processed by at least one processor causes an image processing system to perform the acts of detecting one or more edges of the image. The instructions further cause the image processing system to determine a missing edge in the image by comparing colour gradients of the one or more edges. The missing edge of the image is reconstructed by cloning image pixels based on data pixels of an edge, opposite to the missing edge, amongst the one or more edges to obtain a reconstructed image, wherein the reconstructed image includes a reconstructed edge. The instructions further cause the image processing system to identify outer corner points in the reconstructed image based on quadratic corner points, wherein the quadratic corner points are determined based on the one or more edges and the reconstructed edge. An image perspective correction on the reconstructed image is performed based on the outer corner points, to obtain a processed image.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and system for processing an image extracted from a document. The image processing system detects one or more edges of the image and determines a missing edge in the image by comparing color gradients of the edges. The missing edges are recreated by cloning image pixels based on data pixels of an edge, opposite to the missing edge, amongst the one or more edges to obtain a reconstructed image. Outer corner points in the reconstructed image are identified based on quadratic corner points, wherein the quadratic corner points are determined based on the one or more edges and the reconstructed edge. Further, the image processing system performs an image perspective correction on the reconstructed image, based on the outer corner points, to obtain a processed image.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
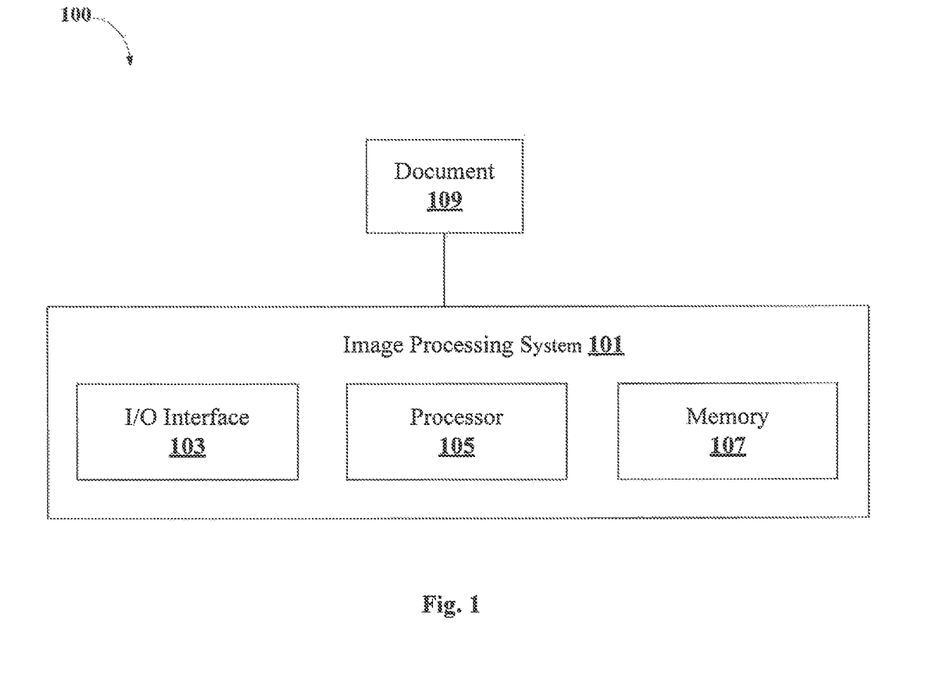
FIG. 1 shows an exemplary environment for processing an image extracted from a document in accordance with some embodiments of the present disclosure.

FIG. 1 shows an exemplary environment for processing an image extracted from a document in accordance with some embodiments of the present disclosure.

The environment 100 comprises an image processing system 101 for processing an image extracted from a document 109. The image processing system 101 comprises a processor 105 to perform one or more image processing operations on the one or more images extracted from the document 109. In an embodiment, the extracted image 203 is a two-dimensional entity, such as a photograph or a screen display. The document 109 may comprise one or more scanned copies of images, such as, a scanned identity card. In an embodiment, the document 109 may be an optical document comprising one or more images captured from one or more optical devices such as cameras, mirrors, lenses, telescopes, microscopes, etc., and one or more digital images. In an embodiment, the image processing system 101 contains various image processing modules 202 (Shown in FIG. 2) to process the extracted image 203, thereby enabling easy identification and retrieval of required information from the extracted image 203.

Figure 2:
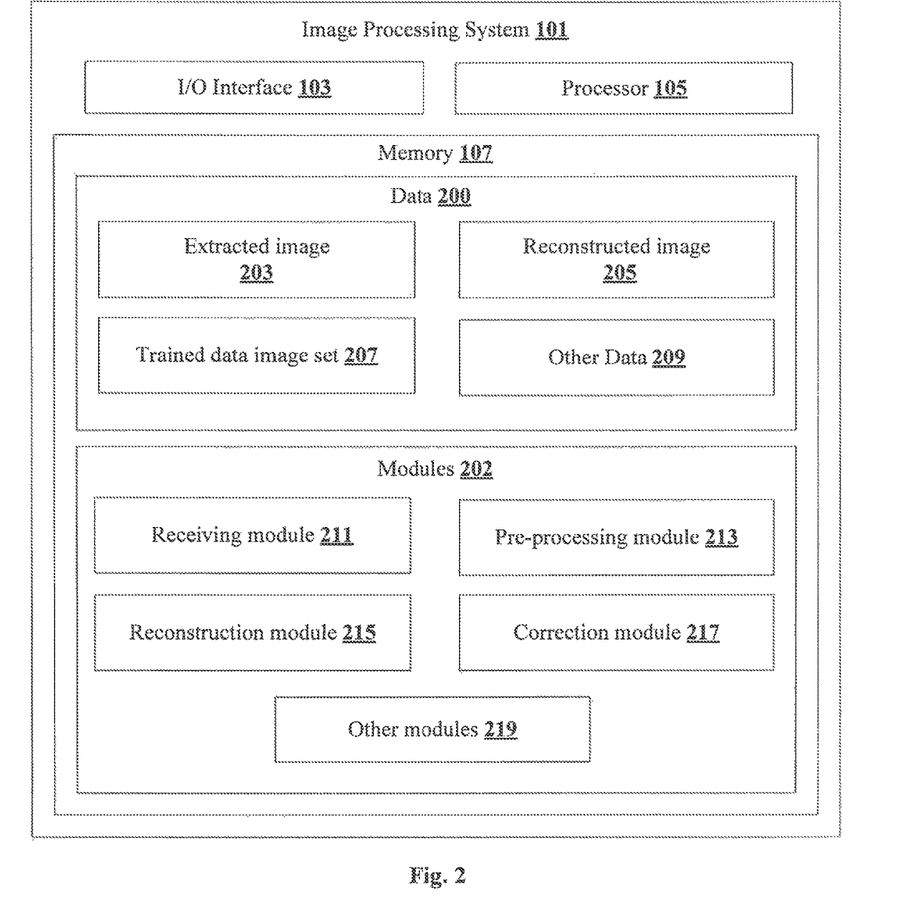
FIG. 2 shows a detailed block diagram illustrating an image processing system in accordance with some embodiments of the present disclosure.

FIG. 2 shows a detailed block diagram illustrating an image processing system in accordance with some embodiments of the present disclosure.

In an embodiment, the image processing system 101 comprises an I/O interface 103, a memory 107 and the processor 105. The I/O interface 103 is configured to extract one or more images from the document 109. The extracted image 203 may comprise one or more defects which need to be corrected by the image processing system 101. The memory 107 is communicatively coupled to the processor 105 and stores the extracted image 203. The processor 105 performs one or more image processing operations on the extracted image 203 using the one or more modules 202.

In an embodiment, the memory 107 may include one or more data 200, including reconstructed image 205, trained data image set 207 and other data 209 along with the extracted image 203. In an embodiment, the data 200 may be stored in the memory 107 in the form of various data structures. Additionally, the aforementioned data 200 can be organized using data models, such as relational or hierarchical data models. The other data 209 may store data, including temporary data and temporary files, generated by modules 202 for performing the various functions of the image processing system 101.

In an embodiment, the extracted image 203 may include, without limitation, digital photographs, image of the captured identity card and the similar. The extracted image 203 is the image that needs to be corrected and processed by the image processing system 101. As an example, when a user captures the image of an identity card, any one side of the identity card may be cropped in the captured image. Also, the captured image may comprise skew, distortion and one or more other disorders which need to be corrected by the image processing system 101.

In an embodiment, the reconstructed image 205 is obtained by reconstructing the one or more missing edges of the extracted image 203 using one or more image reconstruction techniques. As an example, one of the one or more image reconstruction techniques includes cloning one or more image pixels based on data pixels of an edge, opposite to the missing edge, amongst the one or more other edges of the image. The cloning of one or more image pixels is performed to obtain a reconstructed image 205, wherein the reconstructed image 205 includes one or more reconstructed edges.

In an embodiment, the trained data image set 207 of the reconstructed image 205 is generated by extracting at least one of one or more unique features from the reconstructed image 205. As an example, the one or more unique features of an image may include, but not limited to, a unique identification number, position of the identification number and/or photographs in the captured image of the identity card. Further, the extracted trained data image set 207 may be compared with one or more predefined trained data image sets 207 for validating the reconstructed image 205. As an example, the one or more predefined trained data image sets 207 may include, but not limited to, one or more template images and their related features. Furthermore, upon successful validation, the reconstructed images 205 may be stored in the memory 107 for future validation of other images.

In an embodiment, the data 200 stored in the memory 107 are processed by the modules 202 of the image processing system 101. The modules 202 may be stored within the memory 107 as shown in FIG. 2. In an example, the modules 202 are communicatively coupled to the processor 105. In another embodiment, the module 202 may also be present outside the memory 107.

In one implementation, the modules 202 may include, for example, a receiving module 211, pre-processing module 213, reconstruction module 215, correction module 217 and other modules 219. The other modules 219 may be used to perform various miscellaneous functionalities of the image processing system 101. It will be appreciated that such aforementioned modules 202 may be represented as a single module or a combination of different modules.

In an embodiment, the receiving module 211 is configured to receive one or more extracted image 203 from the document 109. The receiving module 211 may also be configured to receive one or more inputs from the user through the I/O interface 103. As an example, the one or more inputs received from the user may include, the predefined trained image sets, and the threshold offset values and other configuration details.

Figure 3A:
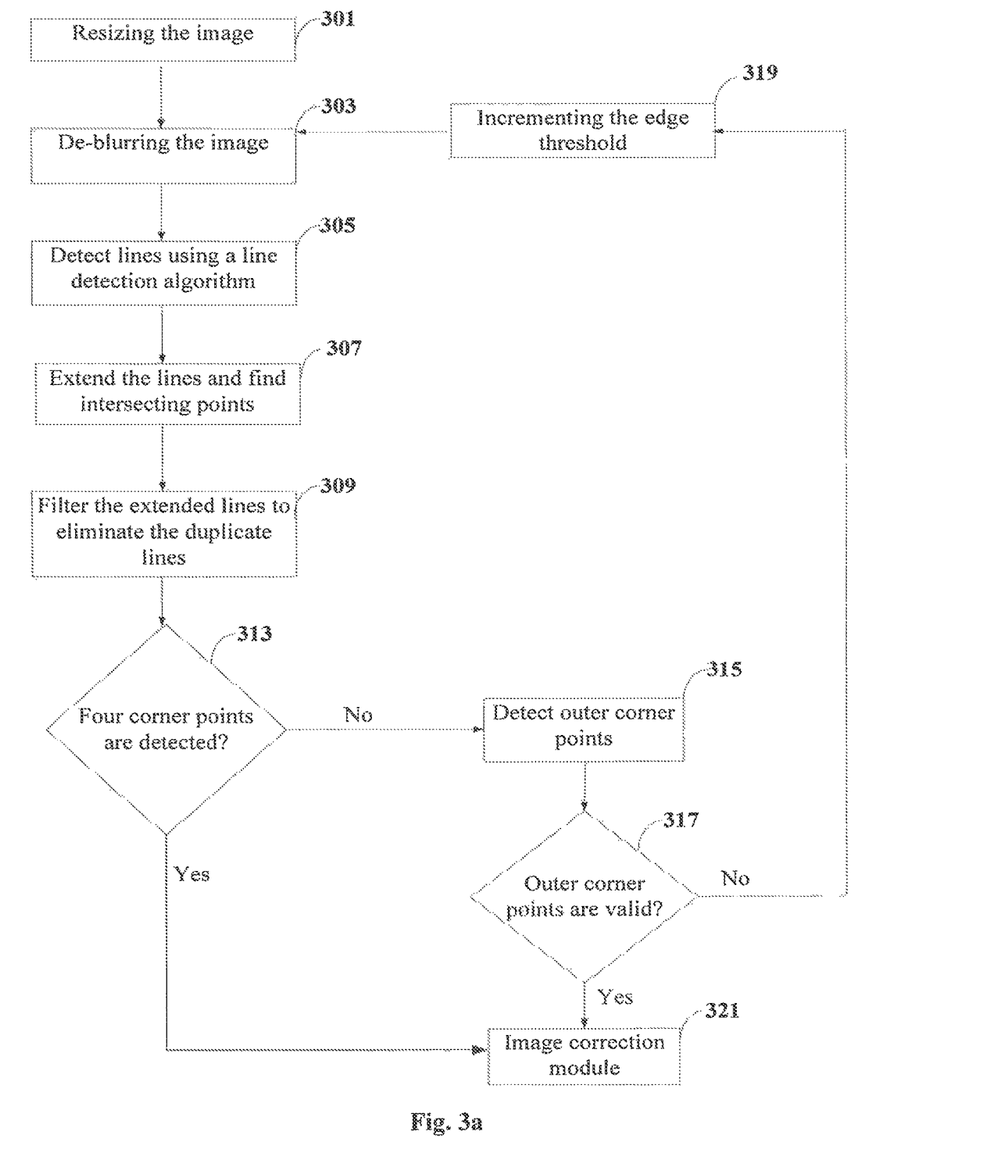
FIG. 3a to 3c show various steps involved in processing an image extracted from a document in accordance with some embodiments of the present disclosure.
Figure 3B:
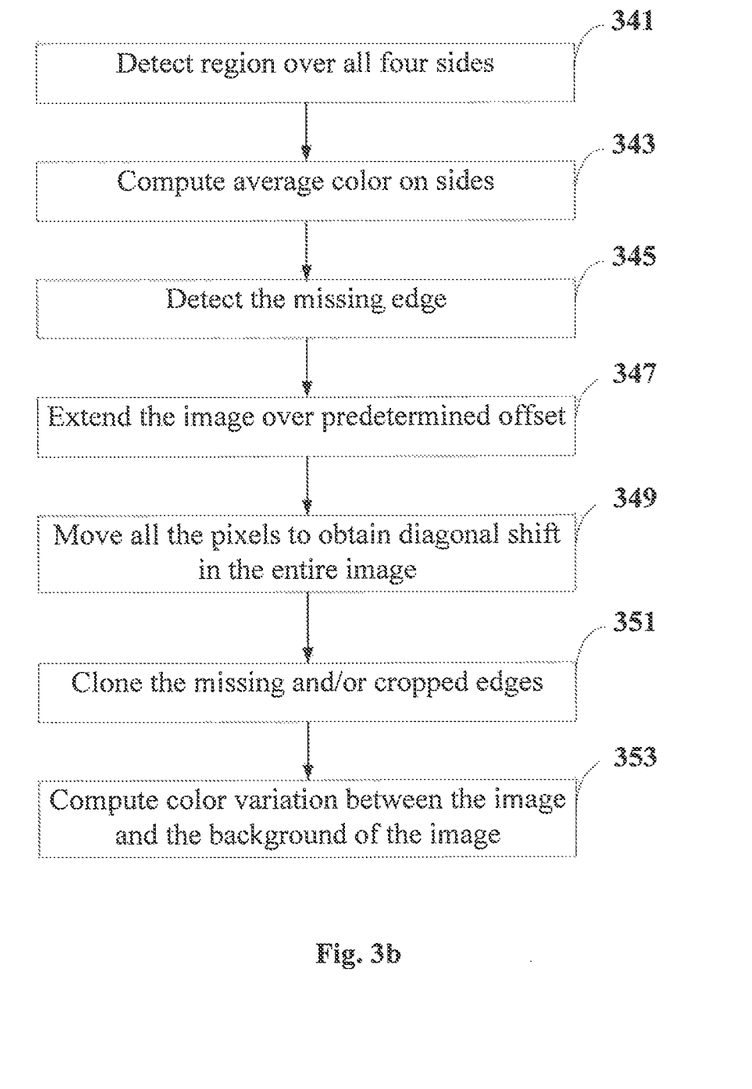
Figure 3C:
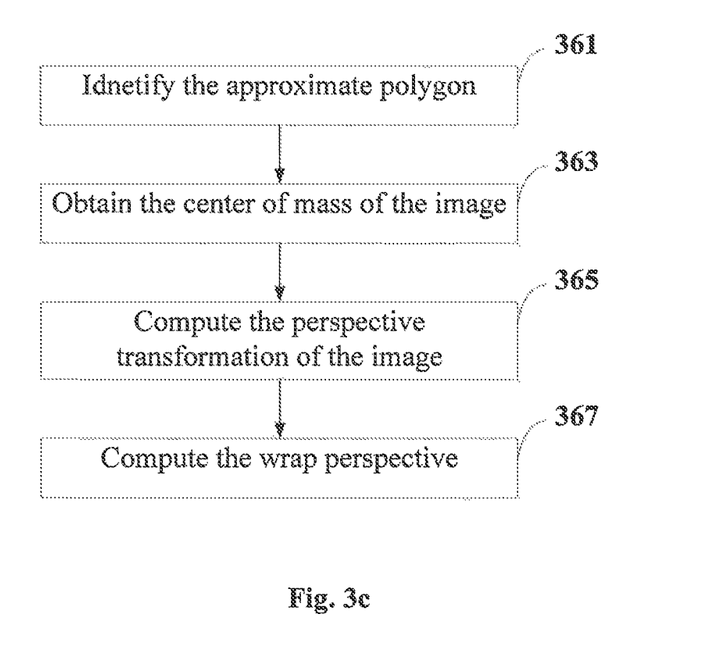

FIG. 3a to 3c show various steps involved in processing an image extracted from the document 109 in accordance with some embodiments of the present disclosure using one or more modules 202 of the image processing system 101.

In an embodiment, at step 301 of FIG. 3a, the pre-processing module 213 resizes the extracted image 203 to a predetermined standard size. As an example, the predetermined standard size for resizing may be 8"×10", 300 ppi or 3000×2400 pixels. Upon resizing, the pre-processing module 213 performs de-blurring of the image, at step 303, to reduce noise in the extracted image 203. A line detection algorithm, such as, Canny & Hough lines crossing algorithm may be used to detect and derive one or more lines and/or axes passing through the plane of the resized image as shown in step 305. In an embodiment, the one or more lines detected by the lines crossing algorithm are sorted in the memory 107 and one or more duplicate lines are eliminated from the image.

In an embodiment, at step 307, the reconstruction module 215 extends all the derived lines along one or more missing edges to detect one or more intersecting lines and corresponding points of intersections. At step 309, the reconstruction module 215 filters each of the extended lines to detect and eliminate one or more duplicate lines in the extracted image 203. Further, the reconstruction module 215 captures the one or more intersecting points in an array stored in the memory 107 to determine the number of outer corner points in the image. In an embodiment, at step 313, the resized image is validated to check if there are only four outer corner points for an ideal case scenario i.e., a two-dimensional image having four outer corner points. If there are only four outer corner points in the resized image, then the image is passed to the image correction module 217 as shown in step 321.

In an embodiment, if there are more quadratic corner points in the image, each of the one or more corner points is filtered to eliminate redundant quadratic corner points. At step 315, the outer corner points of the image are detected based on coordinates along a vertical direction and a horizontal direction corresponding to each of the quadratic corner point present in the filtered set of quadratic corner points. At step 317, the reconstruction module 215 validates each of the detected outer corner points. Upon failing to detect all the outer cornet points of the image, a predetermined edge detection filter threshold offset associated with the filtering process is increased until all the outer corner points of the image are detected as shown in step 319. As an example, the predetermined edge detection filter threshold offset may comprise a maximum value of X and Y, minimum value of X and Y, top most right side X and Y, top most left side X and Y, bottom most right side X and Y, bottom most left side X and Y. Wherein X and Y represent the corresponding corner points on the X coordinate axis and Y coordinate axis respectively. Further, upon successful validation of the outer corner points at step 317, the reconstructed image 205 is passed on to the image correction module 217.

In an embodiment, if one or more edges of the image are missing and/or have been cropped from the image, the reconstruction module 215 detects and reconstructs the missing and/or cropped sides of the image. The reconstruction of the missing edges includes detecting the region of image over all four sides of the image as shown in step 341 of FIG. 3b. Further, at step 343, the reconstruction module 215 computes an average color value on region of the image over all four edges. At step 345, a missing and/or cropped edge is detected when the average color value at any one of the edge is not matching with the average color value at the other three edges of the image. Further, at step 349, a pixel transformation algorithm, such as affine transformation, may be used to regenerate the missing part of the image. The pixel transformation moves all the pixels diagonally by half the size of the predetermined offset value on both X and Y coordinates, such that the image will be moved over an extended boundary diagonally. In other words, all the pixels are moved such that there is a diagonal shift in the image. At step 351, one or more opposite sides of a missing and/or cropped edge is cloned until a predetermined offset threshold is reached. Furthermore, at step 353, a variation in the color of the extended image and the background of the image is computed. This introduces a color edge intensity direction in the reconstructed image 205. This process is repeated on all four edges of the image, thereby forming a complete image.

In an embodiment, respective background boundary of the image may be cloned by the nearby pixels to form a refined image boundary. The reconstruction module 215 also computes a variation in the color between the background of the image and the body of the image to introduce a color edge intensity direction in the reconstructed image 205.

In an embodiment, at step 361 of FIG. 3c, the image correction module 217 detects an approximate polygon on the detected outer corner points and the reconstructed edges. At step 363, the image correction module 217 also determines the center of mass of the reconstructed image 205 on the determined approximate polygon. Further, at step 365, a perspective transformation for the reconstructed image 205 is computed using the center of mass and the standard image size. At step 367, the correction module 217 performs a wrap perspective transformation on the reconstructed image 205 using the predetermined threshold offset as discussed in the reconstruction module 215.

Figure 3D:
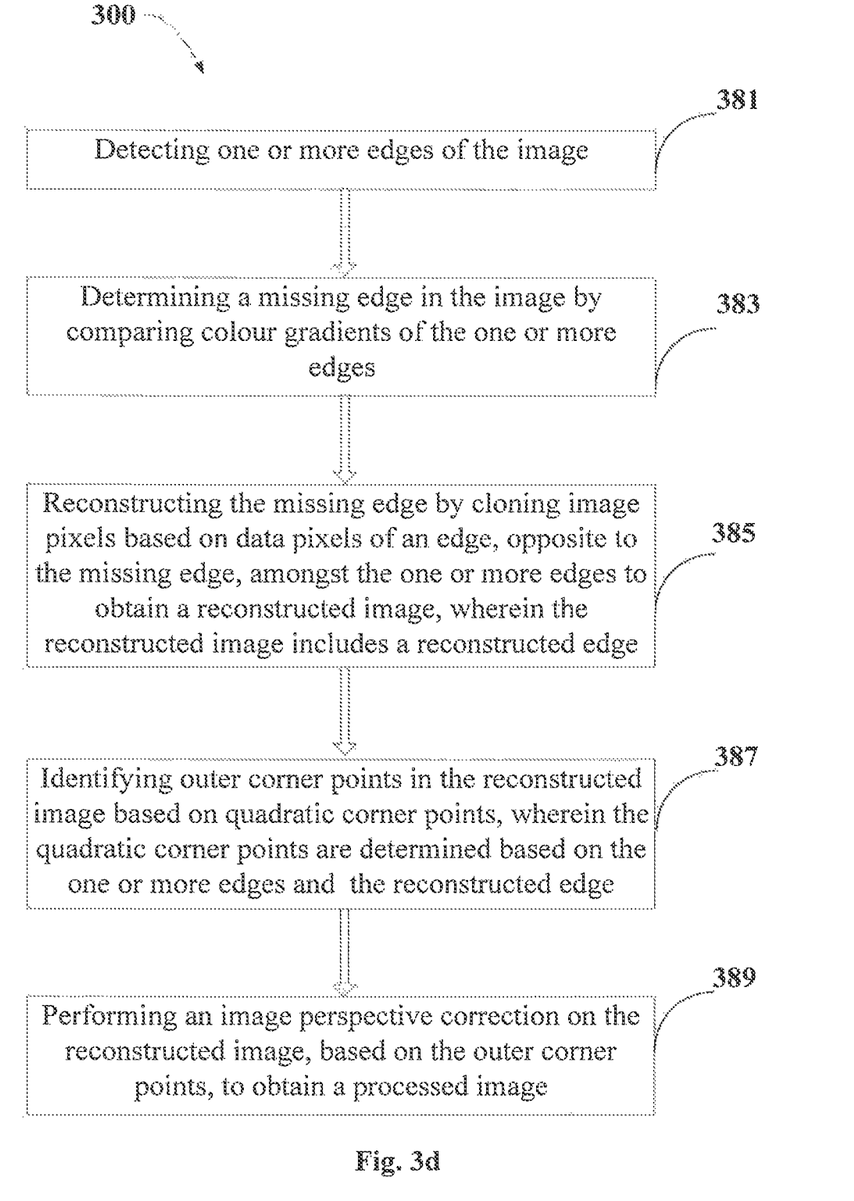
FIG. 3d illustrates a flowchart showing a method for processing an image extracted from a document in accordance with an exemplary embodiment of the present disclosure.

FIG. 3d illustrates a flowchart showing method for processing an image extracted from a document in accordance with an exemplary embodiment of the present disclosure.

As illustrated in FIG. 3d, the method 300 comprises one or more blocks for processing an image using the image processing system 101. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 381, the image processing system 101 detects one or more edges of the image extracted from a document 109. The document 109 may comprise one or more scanned copies of images, such as, a scanned identity card. The extracted image 203 may comprise one or more distortions which need to be processed and eliminated by the image processing system 101.

At block 383, the image processing system 101 determines a missing edge in the image by comparing color gradients of the one or more edges. The missing edges are determined by computing a color gradient along each side of the image and comparing the color gradient of each side with remaining sides.

At block 385, the image processing system 101 reconstructs the missing edge by cloning image pixels based on data pixels of an edge, opposite to the missing edge, amongst the one or more edges to obtain a reconstructed image 205, wherein the reconstructed image 205 includes a reconstructed edge. The size of the image is extended along the missing edge until a predetermined offset is reached to obtain an extended image. An empty region is determined in the extended image by moving data pixels based on the predetermined offset. Further, the determined empty region is cloned based on the data pixel of the edge opposite to the missing edge, to reconstruct the missing edge.

At block 387, the image processing system 101 identifies outer corner points in the reconstructed image 205 based on quadratic corner points, wherein the quadratic corner points are determined based on the one or more edges and the reconstructed edge. The quadratic corner points are derived by extending lines detected along the one or more missing edges and the reconstructed edge. The redundant quadratic corner points amongst the quadratic corner points are filtered to obtain a filtered set of quadratic corner points. Outer corner points in the filtered set of quadratic corner points are detected based on coordinates, along a vertical direction and a horizontal direction, corresponding to each quadratic corner point present in the filtered set of quadratic corner points. An edge detection filter threshold value of the reconstructed image 205 may be increased upon unsuccessful detection of all the outer corner points. Further, the process of detecting the outer corner points is iterated with the increased edge detection filter threshold value till all the outer corner points are detected.

At block 389, the image processing system 101 performs an image perspective correction on the reconstructed image 205, based on the outer corner points, to obtain a processed image. Performing the image perspective correction includes performing polygon approximation on the outer corner points. A mass center of the reconstructed image 205 is determined based on the polygon approximation. A perspective transformation for the reconstructed image 205 is computed based on the mass center and a predefined image size. Further, the computed perspective transformation is applied to the reconstructed image 205 to obtain the processed image.

Computer System

Figure 4:
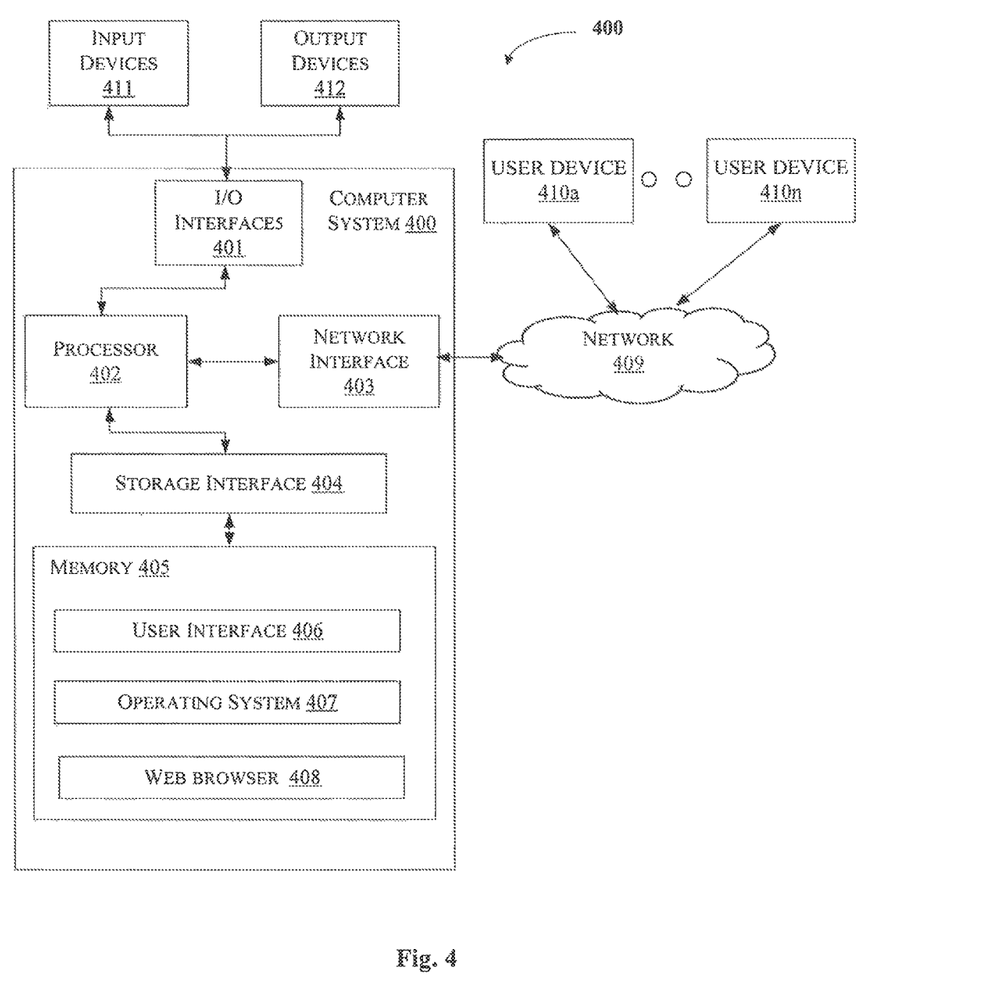
FIG. 4 illustrates a block diagram of an exemplary computer system for implementing embodiments consistent with the present disclosure.

FIG. 4 illustrates a block diagram of an exemplary computer system 400 for implementing embodiments consistent with the present invention. In an embodiment, the computer system 400 is used for processing an image extracted from a document 109 using an image processing system 101. The computer system 400 may comprise a central processing unit ("CPU" or "processor") 402. The processor 402 may comprise at least one data processor for executing program components for executing user- or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, the computer system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with one or more user devices 410 (a, . . . , n). The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/ Internet Protocol (TCP/IP), Wireless Application Protocol (WAP), etc., to communicate with each other. Further, the communication network 409 may include a variety of network devices, including routers, bridges, servers, computing devices, storage devices, etc. The one or more user devices 410 (a, . . . , n) may include, without limitation, personal computer(s), mobile devices such as cellular telephones, smartphones, tablet computers, eBook readers, laptop computers, notebooks, gaming consoles, or the like.

In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user interface application 406, an operating system 407, web server 408 etc. In some embodiments, computer system 400 may store user/application data 406, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), International Business Machines (IBM) OS/2, Microsoft Windows (XP, Vista/ 7/8, etc.), Apple iOS, Google Android, Blackberry Operating System (OS), or the like. User interface 406 may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, scrollers, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 400 may implement a web browser 408 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated Herein

In an embodiment, the present disclosure provides a method to automatically detect and correct skew, distortion and perspective errors in a faulty image.

In an embodiment, the present disclosure provides a method to detect and reconstruct the missing edges of an image, irrespective of background, texture and color of the image.

In an embodiment, the method of the present disclosure eliminates the need for manual verification of the faulty images for retrieving one or more essential information from the image, thereby reducing the man hours and/or efforts required for the same.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| Referral Numerals: | |
| --- | --- |
| Reference Number | Description |
| 100 | Environment |
| 101 | Image processing system |
| 103 | I/O interface |
| 105 | Processor |
| 107 | Memory |
| 109 | Document |
| 200 | Data |
| 202 | Modules |
| 203 | Extracted image |
| 205 | Reconstructed image |
| 207 | Trained data image set |
| 209 | Other data |
| 211 | Receiving module |
| 213 | Pre-processing module |
| 215 | Reconstruction module |
| 217 | Correction module |
| 219 | Other modules |

What is claimed is:

1. A method for processing an image extracted from a document, the method comprising:
    detecting, by an image processing system, one or more edges of the image;
    determining, by the image processing system, a missing edge in the image by comparing color gradients of the one or more edges;
    computing a color gradient along each side of the image; and comparing the color gradient of each side with remaining sides to detect the missing edge;
    reconstructing, by the image processing system, the missing edge by cloning image pixels based on data pixels of an edge, opposite to the missing edge, amongst the one or more edges to obtain a reconstructed image, wherein the reconstructed image includes a reconstructed edge;
    identifying, by the image processing system, outer corner points in the reconstructed image based on quadratic corner points, wherein the quadratic corner points are determined based on the one or more edges and the reconstructed edge; and
    performing, by the image processing system, an image perspective correction on the reconstructed image, based on the outer corner points, to obtain a processed image.

2. The method as claimed in claim 1 further comprises:
    extracting, by the image processing system, at least one unique feature from the processed image;
    comparing, by the image processing system, the at least one unique feature with a trained data set to validate the processed image, wherein the trained data set comprises template images and predefined features set; and
    storing, by the image processing system, the processed image for future usage upon successful validation.

3. The method as claimed in claim 1, wherein reconstructing the missing edge further comprises:
    extending size of the image along the missing edge until a predetermined offset is reached to obtain an extended image;
    determining an empty region in the extended image by moving data pixels based on the predetermined offset; and
    cloning the empty region, based on the data pixel of the edge opposite to the missing edge, to reconstruct the missing edge.

4. The method as claimed in claim 3, wherein cloning the empty region further comprises:
    computing a color variation between background color and a color of the document; and
    applying an edge gradient direction on cloned empty region, wherein the edge image gradient direction is determined based on the color variation.

5. The method as claimed in claim 1, wherein identifying the outer corner points further comprises:
    deriving the quadratic corner points by extending lines detected along the one or more missing edges and the reconstructed edge;
    filtering redundant quadratic corner points amongst the quadratic corner points to obtain a filtered set of quadratic corner points;
    detecting outer corner points in the filtered set of quadratic corner points based on coordinates, along a vertical direction and a horizontal direction, corresponding to each quadratic corner point present in the filtered set of quadratic corner points;
    increasing an edge detection filter threshold value of the reconstructed image upon unsuccessful detection of all the outer corner points; and
    iterating detection of the outer corner points with the increased edge detection filter threshold value till all the outer corner points are detected.

6. The method as claimed in claim 1, wherein performing the image perspective correction on the reconstructed image further comprises:
  performing polygon approximation on the outer corner points;
  determining a mass center of the reconstructed image based on the polygon approximation;
  computing a perspective transformation for the reconstructed image based on the mass center and a predefined image size; and
  applying the perspective transformation to the reconstructed image to obtain the processed image.

7. An image processing system for processing an image extracted from a document, the image processing system comprising:
  a processor; and
  a memory communicatively coupled to the processor, wherein the memory stores processor-executable instructions, which, on execution, causes the processor to perform operations comprising:
    detecting one or more edges of the image;
    determining a missing edge in the image by comparing color gradients of the one or more edges;
    computing a color gradient along each side of the image; and comparing the color gradient of each side with remaining sides to detect the missing edge;
    reconstructing the missing edge by cloning image pixels based on data pixels of an edge, opposite to the missing edge, amongst the one or more edges to obtain a reconstructed image, wherein the reconstructed image includes a reconstructed edge;
    identify outer corner points in the reconstructed image based on quadratic corner points, wherein the quadratic corner points are determined based on the one or more edges and the reconstructed edge; and
    performing an image perspective correction on the reconstructed image, based on the outer corner points, to obtain a processed image.

8. The system as claimed in claim 7 wherein the instructions further causes the processor to perform operations comprising:
  extracting at least one unique feature from the processed image;
  comparing the at least one unique feature with a trained data set to validate the processed image, wherein the trained data set comprises template images and predefined features set; and
  storing the processed image for future usage upon successful validation.

9. The system as claimed in claim 7, wherein operations of reconstructing the missing edge further comprise:
  extending size of the image along the missing edge until a predetermined offset is reached to obtain an extended image;
  determining an empty region in the extended image by moving data pixels based on the predetermined offset; and
  cloning the empty region, based on the data pixel of the edge opposite to the missing edge, to reconstruct the missing edge.

10. The system as claimed in claim 9, wherein operations of cloning the empty region further comprise:
  computing a color variation between background color and a color of the document; and
  applying an edge gradient direction on cloned empty region, wherein the edge image gradient direction is determined based on the color variation.

11. The system as claimed in claim 7, wherein operations of identifying the outer corner points further comprise:
  deriving the quadratic corner points by extending lines detected along the one or more missing edge and the reconstructed edge;
  filtering redundant quadratic corner points amongst the quadratic corner points to obtain a filtered set of quadratic corner points;
  detecting outer corner points in the filtered set of quadratic corner points based on coordinates, along a vertical direction and a horizontal direction, corresponding to each quadratic corner point present in the filtered set of quadratic corner points;
  increasing an edge detection filter threshold value of the reconstructed image upon unsuccessful detection of all the outer corner points; and
  iterating detection of the outer corner points with the increased edge detection filter threshold value till all the outer corner points are detected.

12. The system as claimed in claim 7, wherein operations of performing the image perspective correction on the reconstructed image further comprise:
  performing polygon approximation on the outer corner points;
  determining a mass center of the reconstructed image based on the polygon approximation;
  computing a perspective transformation for the reconstructed image based on the mass center and a predefined image size; and
  applying the perspective transformation to the reconstructed image to obtain the processed image.

13. A non-transitory computer readable medium including instructions stored thereon that when processed by at least one processor cause an image processing system to perform operations comprising:
  detecting one or more edge of an image extracted from a document;
  determining a missing edge in the image by comparing color gradients of the one or more edges;
  computing a color gradient along each side of the image; and comparing the color gradient of each side with remaining sides to detect the missing edge;
  reconstructing the missing edge by cloning image pixels based on data pixels of an edge, opposite to the missing edge, amongst the one or more edges to obtain a reconstructed image, wherein the reconstructed image includes a reconstructed edge;
  identify outer corner points in the reconstructed image based on quadratic corner points, wherein the quadratic corner points are determined based on the one or more edges and the reconstructed edge; and
  performing an image perspective correction on the reconstructed image, based on the outer corner points, to obtain a processed image.

* * * * *